United States Patent
Cobb et al.

(10) Patent No.: US 8,625,884 B2
(45) Date of Patent: Jan. 7, 2014

(54) VISUALIZING AND UPDATING LEARNED EVENT MAPS IN SURVEILLANCE SYSTEMS

(75) Inventors: Wesley Kenneth Cobb, The Woodlands, TX (US); Bobby Ernest Blythe, Houston, TX (US); Rajkiran Kumar Gottumukkal, Houston, TX (US); Ming-Jung Seow, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 1177 days.

(21) Appl. No.: 12/543,204

(22) Filed: Aug. 18, 2009

(65) Prior Publication Data

US 2011/0044533 A1  Feb. 24, 2011

(51) Int. Cl.
- *G06K 9/66* (2006.01)
- *G06T 7/00* (2006.01)
- *H04N 7/18* (2006.01)

(52) U.S. Cl.
USPC ........... 382/155; 382/156; 382/180; 348/148; 348/E785

(58) Field of Classification Search
USPC ........... 382/155, 156, 180; 348/148, E07.085
See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |
| 6,661,918 B1 | 12/2003 | Gordon et al. |
| 6,674,877 B1 | 1/2004 | Jojic et al. |
| 6,678,413 B1 | 1/2004 | Liang et al. |
| 6,856,249 B2 | 2/2005 | Strubbe et al. |
| 6,940,998 B2 | 9/2005 | Garoutte |

(Continued)

FOREIGN PATENT DOCUMENTS

WO  200949314 A2  4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Vikkram Bali
*Assistant Examiner* — Jose M Torres
(74) *Attorney, Agent, or Firm* — Patterson & Sheridan LLP

(57) ABSTRACT

Techniques are disclosed for visually conveying an event map. The event map may represent information learned by a surveillance system. A request may be received to view the event map for a specified scene. The event map may be generated, including a background model of the specified scene and at least one cluster providing a statistical distribution of an event in the specified scene. Each statistical distribution may be derived from data streams generated from a sequence of video frames depicting the specified scene captured by a video camera. Each event may be observed to occur at a location in the specified scene corresponding to a location of the respective cluster in the event map. The event map may be configured to allow a user to view and/or modify properties associated with each cluster. For example, the user may label a cluster and set events matching the cluster to always (or never) generate an alert.

21 Claims, 9 Drawing Sheets

(56) References Cited

U.S. PATENT DOCUMENTS

| | | | |
|---|---|---|---|
| 7,023,469 B1* | 4/2006 | Olson | 348/152 |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 2003/0107650 A1 | 6/2003 | Colmenarez et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0074496 A1* | 3/2008 | Venetianer et al. | 348/150 |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

VISUALIZING AND UPDATING LEARNED EVENT MAPS IN SURVEILLANCE SYSTEMS

BACKGROUND OF THE INVENTION

1. Field of the Invention

Embodiments of the invention provide techniques for conveying information learned by surveillance systems. More specifically, embodiments of the invention relate to techniques for visualizing and updating event maps in surveillance systems.

2. Description of the Related Art

Some currently available video surveillance systems provide simple object recognition capabilities. For example, a video surveillance system may be configured to classify a group of pixels (referred to as a "blob") in a given frame as being a particular type of object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" (acceptable) or "abnormal" (anomalous) behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY OF THE INVENTION

One embodiment of the invention includes a computer-implemented method. The method may generally include receiving a request to view an event map of a specified event type involving a specific class of object for a scene depicted in a sequence of video frames; retrieving a background image associated with the scene; retrieving an adaptive theory resonance (ART) network modeling the specified event type, wherein the ART network is generated from the sequence of video frames depicting the scene captured by a video camera, and wherein a location of each cluster in the ART network models a region of the scene were one or more events of the specified type has been to observed to occur; generating a visual representation of each cluster; and superimposing each visual representation over the background image of the scene.

Another embodiment of the invention includes a computer-readable storage medium containing a program which, when executed by a computer processor, performs an operation. The operation may generally include receiving a request to view an event map of a specified event type for a scene depicted in a sequence of video frames; retrieving a background image associated with the scene; retrieving an adaptive theory resonance (ART) network modeling the specified event type, wherein the ART network is generated from the sequence of video frames depicting the scene captured by a video camera, and wherein a location of each cluster in the ART network models a region of the scene were one or more events of the specified type has been to observed to occur; generating a visual representation of each cluster; and superimposing each visual representation over the background image of the scene.

Still another embodiment includes a system having one or more computer processors and a memory containing a program, which, when executed by the one or more computer processors is configured to perform an operation. The operation may generally include receiving a request to view an event map of a specified event type for a scene depicted in a sequence of video frames; retrieving a background image associated with the scene; retrieving an adaptive theory resonance (ART) network modeling the specified event type, wherein the ART network is generated from the sequence of video frames depicting the scene captured by a video camera, and wherein a location of each cluster in the ART network models a region of the scene were one or more events of the specified type has been to observed to occur; generating a visual representation of each cluster; and superimposing each visual representation over the background image of the scene.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
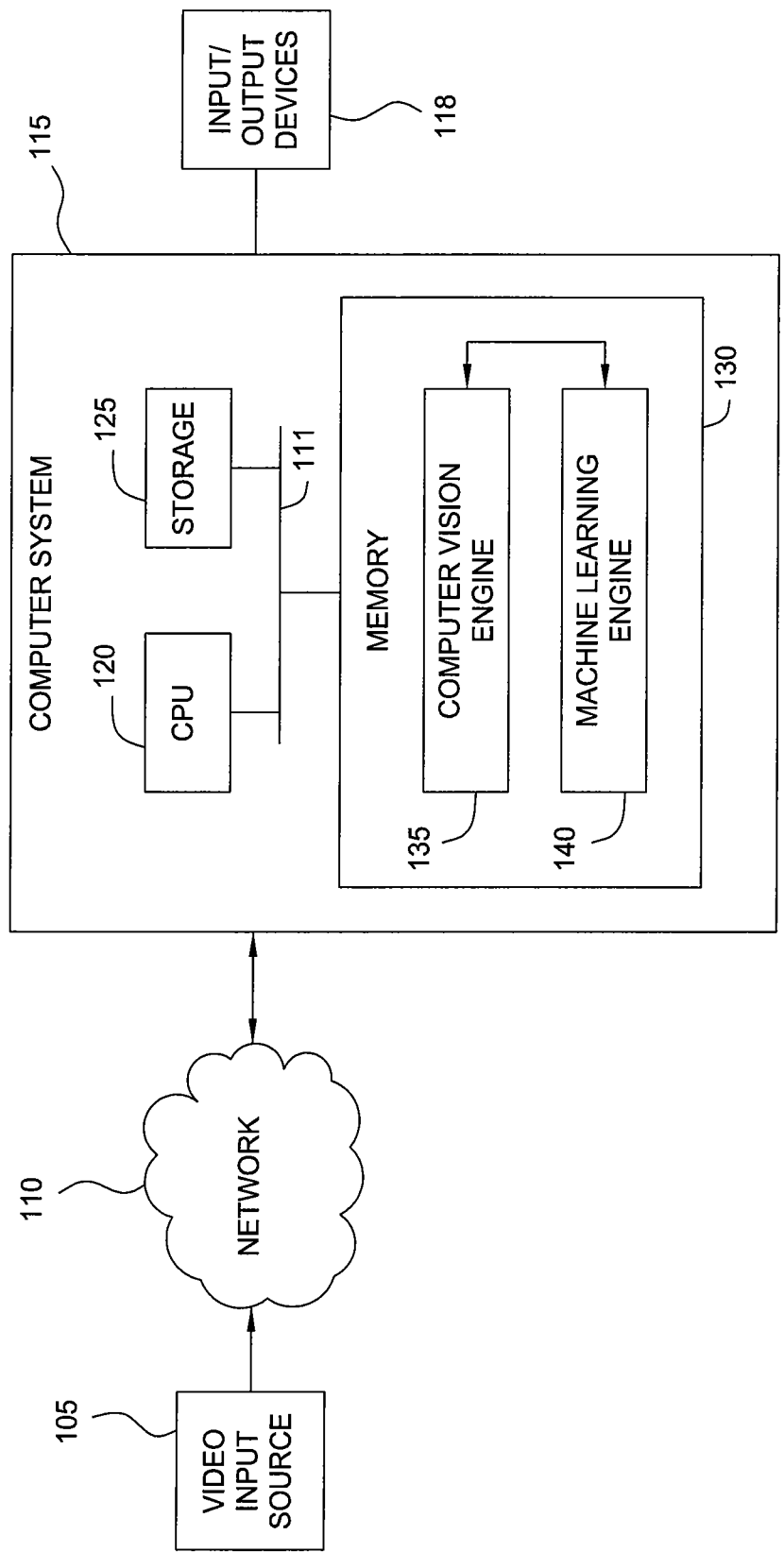
FIG. 1 illustrates components of a video analysis and behavior-recognition system, according to one embodiment of the invention.

Embodiments of the invention provide an interface configured to visually convey information learned by a behavior-recognition system. The behavior-recognition system may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to evaluate a stream of video frames. Typically, each frame of video may be characterized using multiple color (or grayscale) channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames. Each context event may provide kinematic data related to a foreground object observed by the computer vision engine in the sequence of video frames.

Data output from the computer vision engine may be supplied to the machine learning engine. In one embodiment, the machine learning engine may evaluate the context events to generate "primitive events" describing object behavior. Each primitive event may provide semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories representing a higher-level abstraction of a car parking in the scene—generated from the primitive events underlying multiple observations of different cars entering and parking. Further still, patterns representing an anomalous event (relative to prior observation) or events identified as an event of interest may result in alerts passed to users of the behavioral recognition system.

In one embodiment, the machine learning engine may include a mapper component configured to parse data coming from the context event stream and the primitive event stream and to supply portions of these streams as input to multiple neural networks (e.g., Adaptive Resonance Theory (ART) networks). Each individual ART network may generate clusters from the set of inputs data specified for that ART network. Each cluster represents an observed statistical distribution of a particular thing or event being observed by that ART network. Further, the mapper component may be configured to detect unusual events occurring in the scene depicted by the video frames. For example, the mapper component may monitor the clusters that emerge from a given one of the ART networks, and in some cases, when a set of inputs results in a new cluster, generate an alert representing the occurrence of an unusual or anomalous event. In one embodiment, the ART network may be configured to provide dynamic clustering. That is, unlike ART networks known in the art, a cluster in the modified ART network described herein may change in size as each set of input data is mapped to that cluster. As described in greater detail below, a cluster may initially be defined as a relatively small size (e.g., an area corresponding to a radius of 5-10 pixels). However, as inputs are mapped to that cluster, the size may grow and change over time. Further, the clusters may decay over time. For example, if a cluster does not receive a set of input data (reinforcing the importance of that cluster) for a specified period of time, such a cluster may be removed from an ART network.

Further, an ART network of the mapper component 211 may determine whether a detected event matches a cluster, according to one embodiment. For example, the ART network may receive a vector as input and either update an existing cluster or create a new cluster, as determined using a choice test and a vigilance test for the ART network. The choice test provides a ranking of the existing clusters, relative to the vector input data. Once ranked, the vigilance test evaluates the existing clusters to determine whether to map the input to a given cluster. If no cluster is found to update using the data supplied to the input layer, evaluated sequentially using the ranked clusters, then a new cluster is created.

In one embodiment, the machine learning engine may also include a transaction server. The transaction server may generate an event map using data retrieved from the mapper component. Further, the transaction server allows users to: (i) explore data learned by the machine learning engine and (ii) supply metadata specifying how the system is to respond to certain observed events and/or behaviors (for example, when to produce or not to produce an alert). For example, a user may supply metadata to override default behavior of the machine learning engine. The default behavior may include alerting the user upon detecting novel or rare events occurring (the user is not alerted upon detecting events that frequently occur). For example, the transaction server may receive a request to view an event map generated by the mapper component for a scene. In response, the transaction server may generate a visual representation of the clusters superimposed over background model for the specified scene.

Further, the transaction server may also receive user requests to associate metadata with one of the clusters. The metadata may be used to guide system behavior. For example, a user may specify to name a cluster, always alert on a cluster, ignore a cluster, modify metadata for a cluster, etc.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the invention. As shown, the behavior-recognition system 100 includes a video input source 105, a network 110, a computer system 115, and input and output devices 118 (e.g., a monitor, a keyboard, a mouse, a printer, and the like).

The network 110 may transmit video data recorded by the video input 105 to the computer system 115. Illustratively, a bus 111 on the computer system 115 connects a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn, and remember details regarding events (and types of events) that transpire within the scene over time.

In one embodiment, the machine learning engine 140 receives the video frames and the data generated by the computer vision engine 135. The machine learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250, 270 running on another computer system may request (or receive) the results of over network 110.

Figure 2:
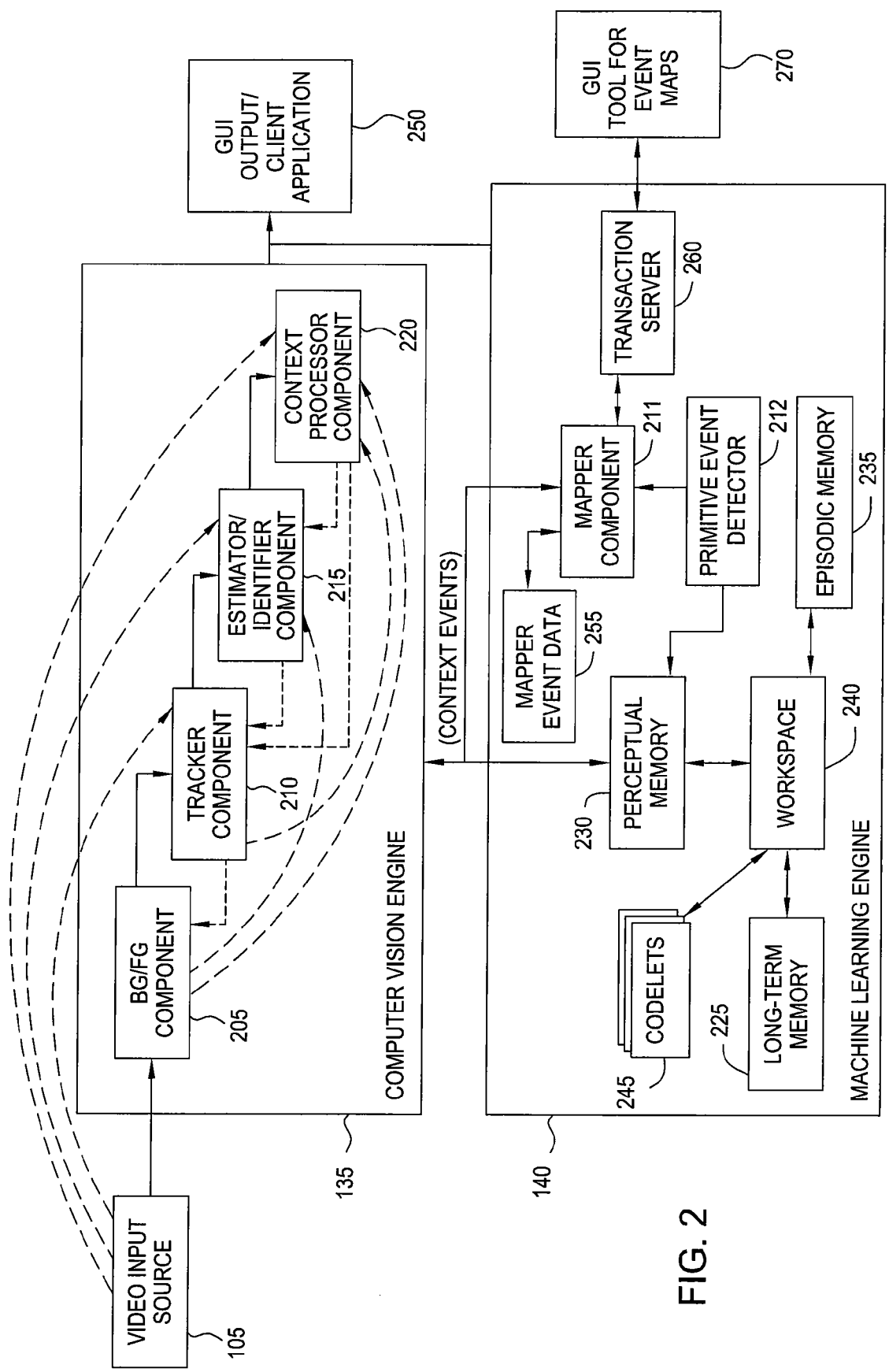
FIG. 2 illustrates components of a computer vision engine and of a machine learning engine, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline. Additionally, portions of the scene determined to depict scene background maybe used to update pixel values in a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene. Further, once the tracker component 210 identifies an object, the tracker component 210 may continue tracking the object even if the BG/FG component 205 does not continuously report pixels of the object as foreground.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. In an alternative embodiment, the machine learning engine 140 may classify foreground objects observed by the vision engine 135. For example, the machine learning engine 140 may include an unsupervised classifier (e.g., an ART network) configured to observe, and ultimately classify actors in a scene based on a plurality of micro-features (e.g., size, speed, appearance, etc).

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates kinematic data regarding the car's position and velocity. In such a case, this information is supplied to the machine learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine learning engine 140 includes a long-term memory 225, a perceptual memory 230, an episodic memory 235, a workspace 240, codelets 245, a mapper component 211, mapper event data 255, and a transaction server 260. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular event. That is, the episodic memory 235 may encode specific details of a particular event, i.e., "what, when, and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle appears and parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

Further, as described in greater detail below, the mapper component 211 may receive the context event stream and the primitive event stream and parse information sent to multiple ART networks to generate statistical models of what occurs in the scene for different groups of context events and primitive events. The statistical models of what occurs in the scene for different groups of context events and primitive events may be referred to as what is "learned" by the mapper component 211 and may be stored as the mapper event data 255. As described below, the transaction server 260 may generate, at least in part from the mapper event data 255, event maps for display via a GUI tool 270.

Note, however, the transaction server 260 is shown in FIG. 2 as a separate component from the machine learning engine 140 for reasons of clarity. In an alternative embodiment, the functions provided by the transaction server 260 may be integrated into the machine learning engine 140. For example, the event maps provided for display via the GUI tool 270 may be generated directly by the mapper component 211. Of course, one of ordinary skill in the art will recognize that the functions of the transaction server 260 may be implemented in a variety of ways.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine learning engine 140 performs a cognitive cycle used to observe, and learn, about patterns of behavior that occur within the scene.

In one embodiment, the transaction server 260 processes user requests from the GUI tool 270 for event maps. The transaction server 260 may be configured to retrieve information from the mapper component 211 in order to generate a visual display of information learned by the machine learning engine, i.e., to generate the requested event map. In another embodiment, the mapper component 211 may itself integrate the transaction server 260. Table I shows examples of transactions that may be supported by the transaction server 260:

TABLE I

Transactions supported by the transaction server 260

| Transaction | Description |
| --- | --- |
| Get preset list | Obtain a list of presets for a specified camera |
| Get scene image | Obtain a picture that represents a scene as viewed by the camera |
| Get list of maps | Obtain a list of maps for a specified preset |
| Get map | Obtains data for a specified map (e.g., including properties) |
| Set always alert | Specifies to always alert on an event matching a specified cluster |
| Set always ignore | Specifies to never alert on an event matching a specified cluster |
| Modify property | Modify a specified property of a specified cluster |

Figure 3:
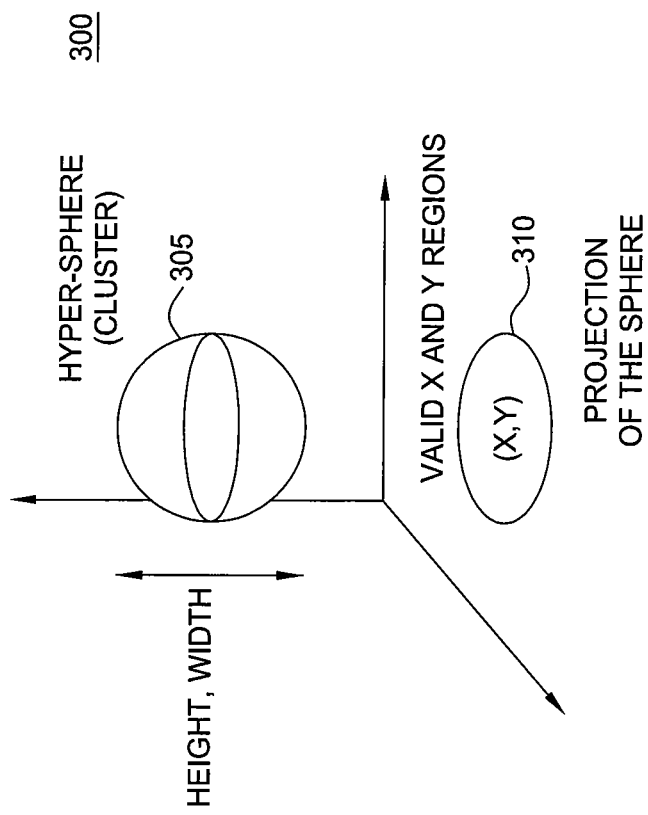
FIG. 3 illustrates a graph showing a cluster generated by an ART network and a two-dimensional (2D) projection of the cluster, according to one embodiment of the invention.

FIG. 3 illustrates a graph 300 showing a cluster 305 generated by an ART network and a two-dimensional (2D) projection 310 of the cluster 305, according to one embodiment. In this example, the cluster 305 is represented as a hyper-sphere (i.e., a sphere in n dimensions) generated from input data regarding foreground objects classified as "persons." In particular, the hyper-sphere has four dimensions, an X, Y position of the person and a height and width of the person (in pixels). The center of the hyper-sphere provides a prototypical position, height and width a person in the scene, based on observations made over time. In one embodiment, the hyper-sphere is defined by the mean and variance from the prototypical person represented by cluster 305 calculated from the input data mapped to cluster 305. For example, the boundary may represent a distance of 2.5 standard deviations away from the mean for one of the input layer dimensions. Each new set of input data mapping to cluster 305 is used to train (refine) the prototype (X, Y) position, height, and width represented by the cluster 305. Additionally, graph 300 shows the cluster 305 projected into the (X, Y) plane. The projection 310 represents a region of the scene where objects represented by the cluster (e.g., foreground objects classified as depicting persons) have been observed to appear, up to 2.5 standard deviations from the prototypical position. Accordingly, when persons appear in another region of the scene (i.e., outside of the projection 310), it may represent the occurrence of an unusual event, resulting in the generation of an alert by the mapper component 211.

Figure 4:
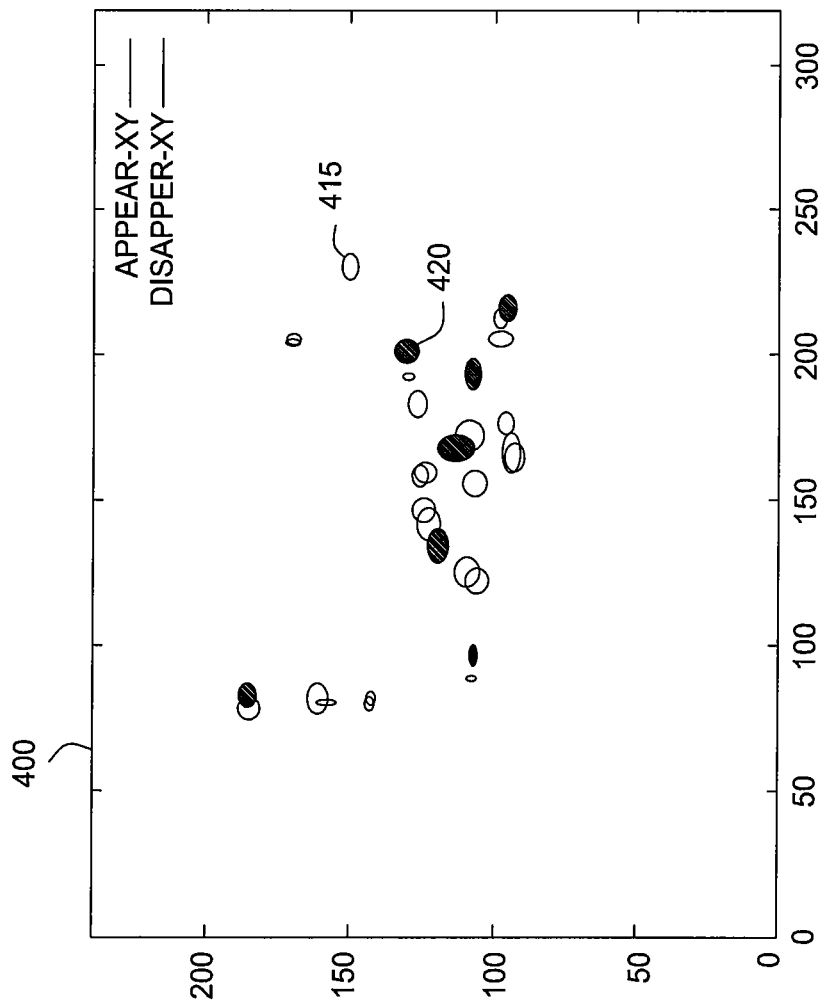
FIG. 4 illustrates an example of a set of clusters generated by two independent ART networks, according to one embodiment of the invention.

FIG. 4 illustrates an example of a set of clusters generated by two independent ART networks, according to one embodiment of the invention. In this particular example, the clusters represent the (X, Y) position in a scene where objects have been observed to appear (represented by the solid clusters, e.g., cluster 415) or disappear (represented by the dashed clusters, e.g., cluster 420). Additionally, the objects are not limited to a particular classification type (e.g., foreground objects classified by the computer vision engine 135 as depicting a "person" or a "vehicle", instead, the clusters represent a position in the video where any foreground object is observed to appear or disappear.

Figure 5:
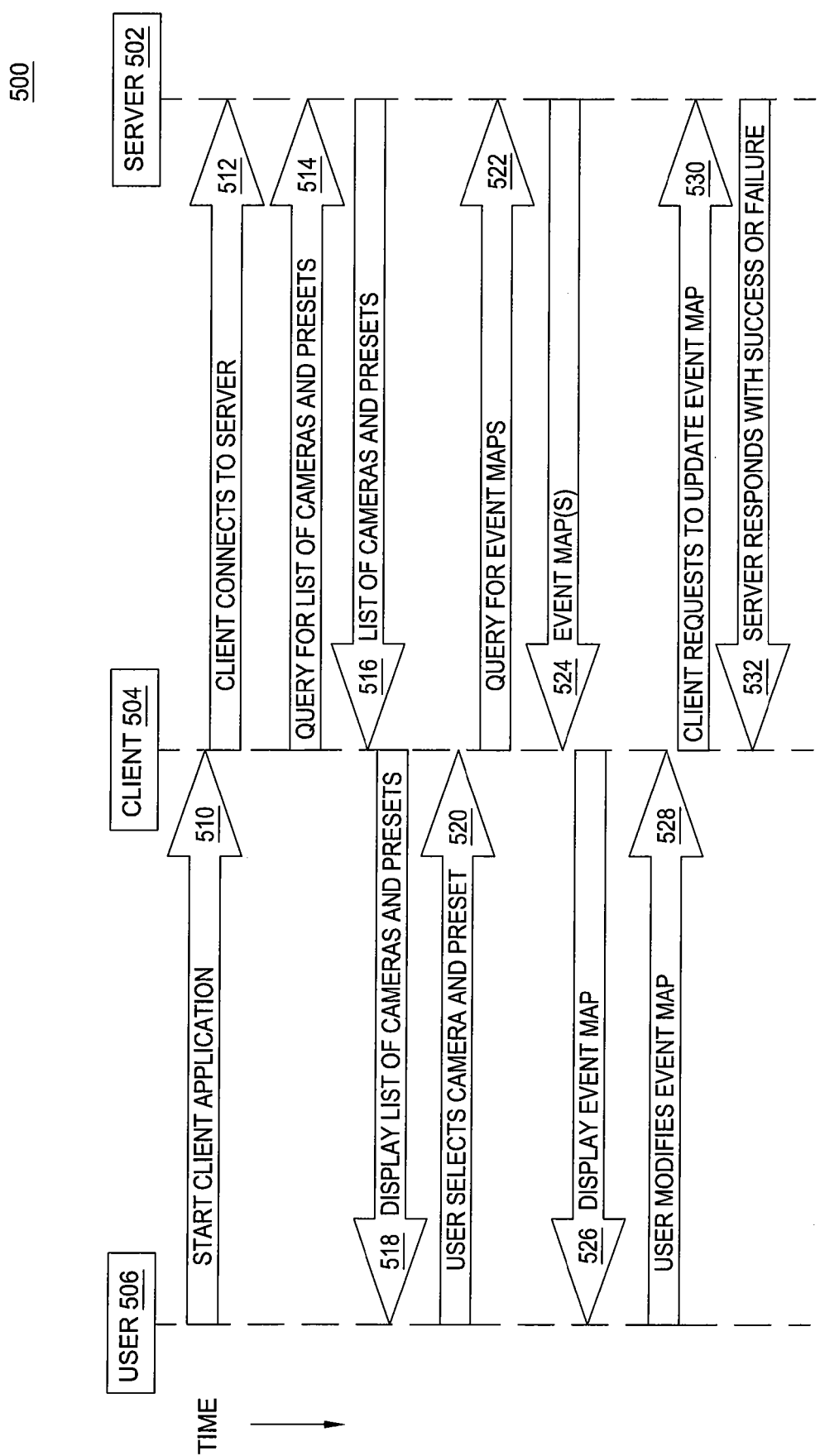
FIG. 5 illustrates a method for a server application to interact with a client application to visually convey an event map to a user of the client application, according to one embodiment of the invention.

FIG. 5 illustrates a method 500 for a server application (or simply, server) 502 to interact with a client application (or simply, client) 504 to visually convey an event map to a user 506 using the client 504, according to one embodiment of the invention. In one embodiment, the server 502 may be the machine learning engine 140 of FIG. 2. In another embodiment, the server 502 may be one or both of the mapper component 211 and the transaction server 260. In one embodiment, the server 502 may listen for client requests on a specified port (e.g., via Berkeley sockets application programming interface (API) over Transmission Control Protocol/Internet Protocol (TCP/IP)). Further, the client 504 and the server 502 may communicate using any application-layer network protocol such as Hypertext Transfer Protocol (HTTP), File Transfer Protocol (FTP), Simple Object Access Protocol (SOAP), etc. Further still, each request to and/or response from the server 502 may be in a format such as Extensible Markup Language (XML).

As shown, the method 500 begins at step 510, where the user 506 invokes the client 504. At step 512, the client 504 connects to the server 502. For example, the client 504 may connect to a specified IP address and port number on which the server 502 is listening. At step 514, the client 504 queries for a list of cameras and associated presets 516. Each preset may include a location and orientation of a respective camera observing (or having observed) a scene. At step 516, the server 502 returns a list of cameras and presets to the client 504. At step 518, the client 504 displays the list of cameras and presets to the user 506.

At step 520, the user 506 selects a camera and a preset. The client 504 then queries for the event maps from the server 502 for the selected camera and preset (step 522). The query may also specify filtering criteria for excluding event maps from being displayed, according to one embodiment. At step 524, the server 502 returns the event maps to the client 504. In another embodiment, the user need not select a camera and/or a preset. For example, the server 502 may be configured to return the event maps for a currently active scene. At step 526, the client 504 displays the event maps to the user 506. In one embodiment, the client 504 may generate a display based on specified filtering criteria. In one embodiment, the event map may include clusters for an event type superimposed on a background model of the selected camera and preset. The client 504 may superimpose the clusters on the background model (both of which may be received from the server 502 in step 524), according to one embodiment. The client 504 may allow the user 506 to select one or more clusters of the event map. The client 504 may also display properties associated with selected clusters. The properties may include an identifier for the cluster, a label of the cluster, a location of the cluster in the scene, a size of the cluster, identifiers for ancestors of the cluster, alert preferences for the cluster, etc. Ancestors of a cluster refer to two or more clusters that are merged to form the cluster. The client 504 may also allow the user 506 to modify one or more properties for a cluster. For example, a user 506 may modify a label or display properties for a cluster to customize how the event map conveys information for a particular event.

At step 528, the user 506 modifies the displayed event map via the client 504. For example, the user 506 may modify a property of a cluster in the displayed event map. At step 530, the client 504 sends a request to the server 502 to update the event map. In one embodiment, the server 502 may treat each client request as a separate transaction. At step 532, the server 502 attempts to update the event map and returns a result to the client 504 indicating success or failure of the attempted update. After the step 532, the method 500 may terminate or return to the steps 512, 520, or 528. At a discretion of the user, the method 500 may also terminate prior to the step 520 or the step 528.

Figure 6:
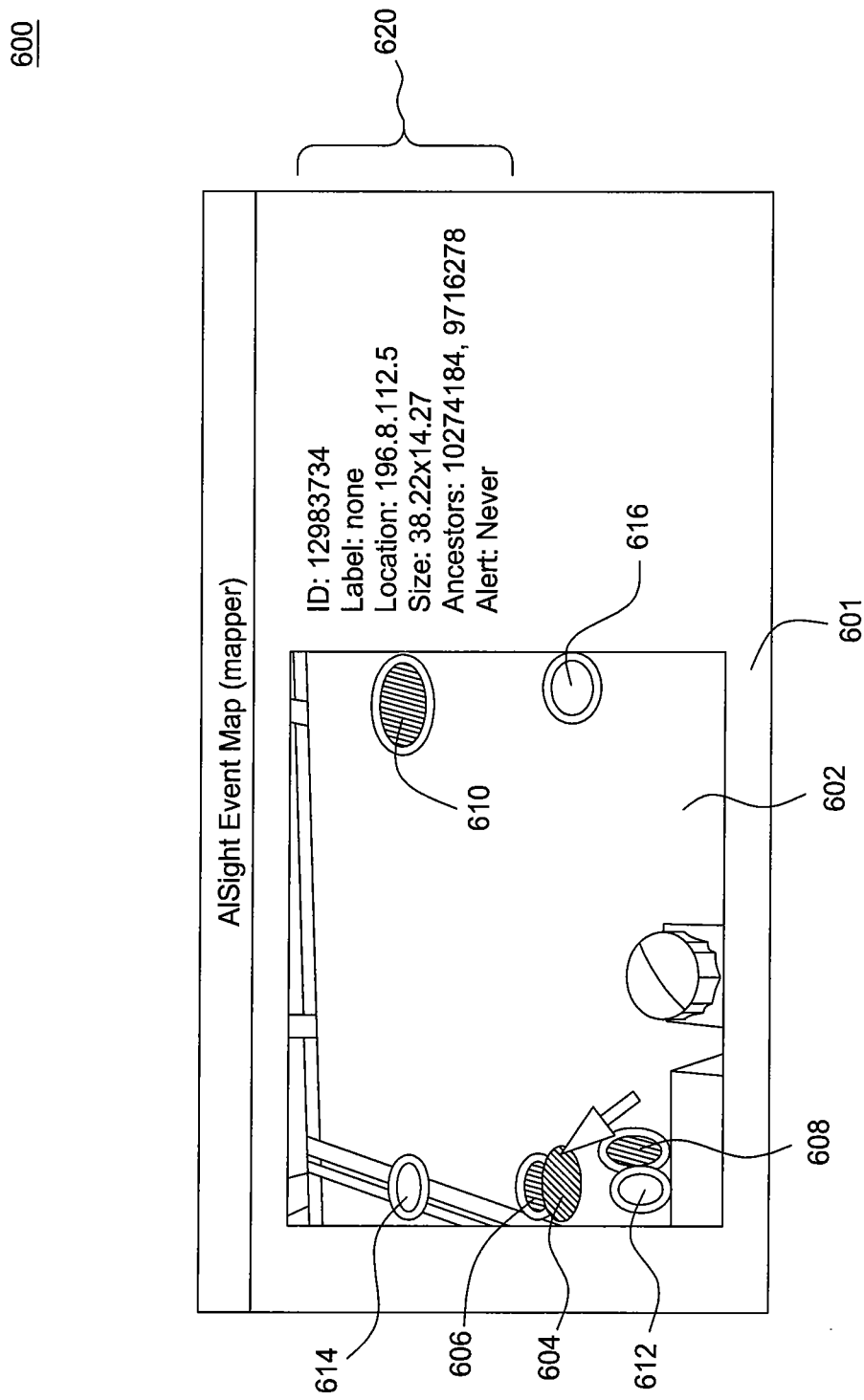
FIG. 6 illustrates a graphical user interface (GUI) for visually conveying an event map, according to one embodiment of the invention.

FIG. 6 illustrates a GUI 600 which provides an example of an event map, according to one embodiment of the invention. As shown, the GUI 600 includes an event map 601 and properties 620 associated with a cluster. The event map 601 includes a set of dark-shaded clusters 604, 606, 608, 610 and a set of light-shaded clusters 612, 614, 616. For example, the dark-shaded clusters 604, 606, 608, 610 may represent a "person appearing" event, while the light-shaded clusters 612, 614, 616 may represent a "person disappearing" event. Further, a dark-shaded cluster 604 is shown as being selected by the user. Thus, the properties 620 are associated with the selected cluster 604 and include an identifier for the cluster 604 (i.e., 12983734), a label for the cluster 604 (i.e., "none"), a location of the cluster 604 in the event map 601 (i.e., coordinates, measured in pixels, of "196.8, 112.5"), a size of the cluster 604 (i.e., 38.22×14.27 in pixels), identifiers for ancestors of the cluster 604 (i.e., 10274184, 9716278), and alert settings for the cluster 604 (i.e., "Never"). In this example, a user may assign a label for the cluster 604. The user may also set the cluster 604 to alert whenever the machine learning engine determines that an event mapping to this cluster has occurred.

Figure 7:
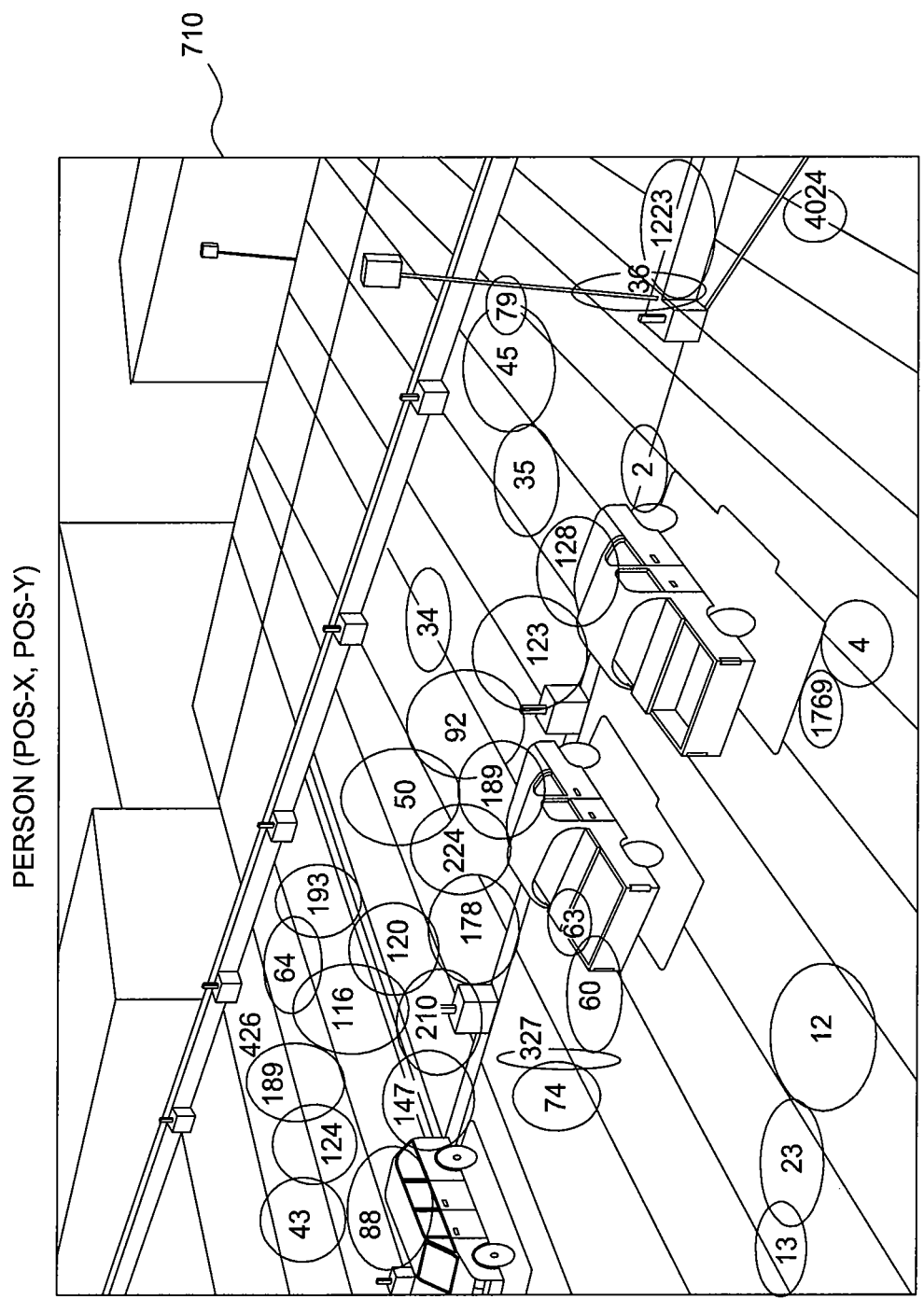
FIG. 7 illustrates examples of clusters generated by different ART networks superimposed over a video frame depicting a scene, according to one embodiment of the invention.

FIG. 7 illustrates examples of clusters generated by different ART networks superimposed over a video frame depicting a scene, according to one embodiment of the invention. FIG. 7 shows a video frame 710 with a set of clusters superimposed over the frame image. In this example, each cluster corresponds to a position in the frame 710 where objects classified as "person" have been observed to appear in the scene. That is, each cluster represents a prototypical position for the position of a person in the scene and the bounds of each cluster may be determined relative to the prototypical position from the input values mapped to that cluster. Illustratively, each cluster is labeled with a number to represent the number of input instances that mapped to a respective cluster. In one embodiment, if an object classified as person were to appear outside of one of the established clusters, then the mapper component 211 may generate an alert. Further, the relative significance of each cluster may be tied to the number of input instances that mapped to a given cluster. If the ART network which generated the clusters shown in FIG. 7 mapped an instance of input data to a cluster of low relative significance, an alert may be generated to represent the occurrence of an event that, while not resulting in a new cluster being created for this ART network, was nevertheless unusual relative to what has been observed to have occurred in the scene depicted by frame 710. Using the clusters, should an object (whether classified as "person," "vehicle," "unknown," or "other") appear, e.g., outside of any cluster, the mapper component 211 may recognize this as an unusual event, and in response, generate an alert indicating that something unusual has occurred. That is, the mapper is configured to only alert based on statistically infrequent events, according to one embodiment. The GUI tool 270 for event maps allows users to both: (i) visualize what the mapper sees and (ii) specify metadata to change system behavior.

Figure 8:
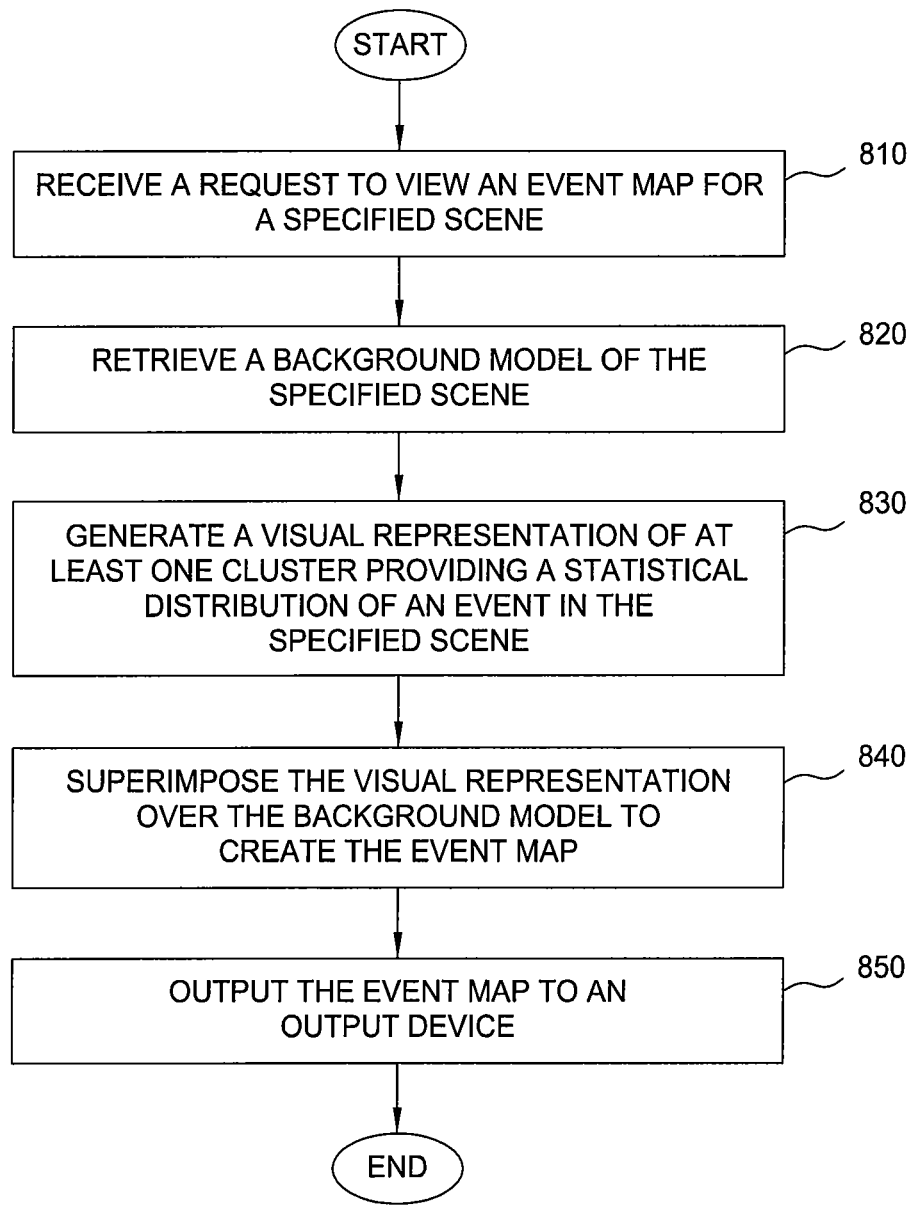
FIG. 8 illustrates a method for visually conveying an event map, according to one embodiment of the invention.

FIG. 8 illustrates a method 800 for generating an event map of a scene, according to one embodiment of the invention. As shown, the method 800 begins at step 810, where the transaction server 260 receives a request to view an event map for a specified scene. For example, a user may specify a camera and a preset for a camera (for which the user desires to view event maps). At step 820, the transaction server 260 retrieves a background model generated by the computer vision engine 135. At step 830, transaction server 260 generates a visual representation of at least one cluster providing a statistical distribution of an event in the specified scene. In one embodiment, if there are no clusters to be displayed (i.e. the system has not observed a sufficient number of events yet), the transaction server 260 may merely display the background model. The mapper component 211 may derive the statistical distribution from data streams generated from a sequence of video frames depicting the specified scene captured by a video camera. As noted above, the at least one cluster may emerge as input streams are supplied to an ART network initialized for an event type. Further, the transaction server 260 may generate a visualization of each cluster at least in part from values of properties of the respective cluster. For example, the transaction server 260 may determine at least one of shape, size, transparency, orientation, fill color, border thickness, border color, pattern, label, and marking of the visual representation from values of properties of the respective cluster (e.g., relative significance of the cluster).

At step 840, the transaction server 260 may superimpose the visual representation over the background model to create the event map. In another embodiment, the transaction server merely provides the background image and a cluster, delegating, to a client application, the steps of generating a visual representation of the cluster and/or superimposing the visual representation on the background image. The event map represents information learned by the mapper component 211. For example, the event map may represent ART network clusters that emerge from primitive events and input data showing where people appear in given scene. Further, the GUI tool 270 for event maps may be configured to allow the user to view and/or modify properties of any cluster selected by the user. Modifying a property of a selected cluster is described further below in conjunction with FIG. 9. At step 850, the mapper component 211 may output the event map to a graphical display. After step 850, the method 800 terminates.

Figure 9:
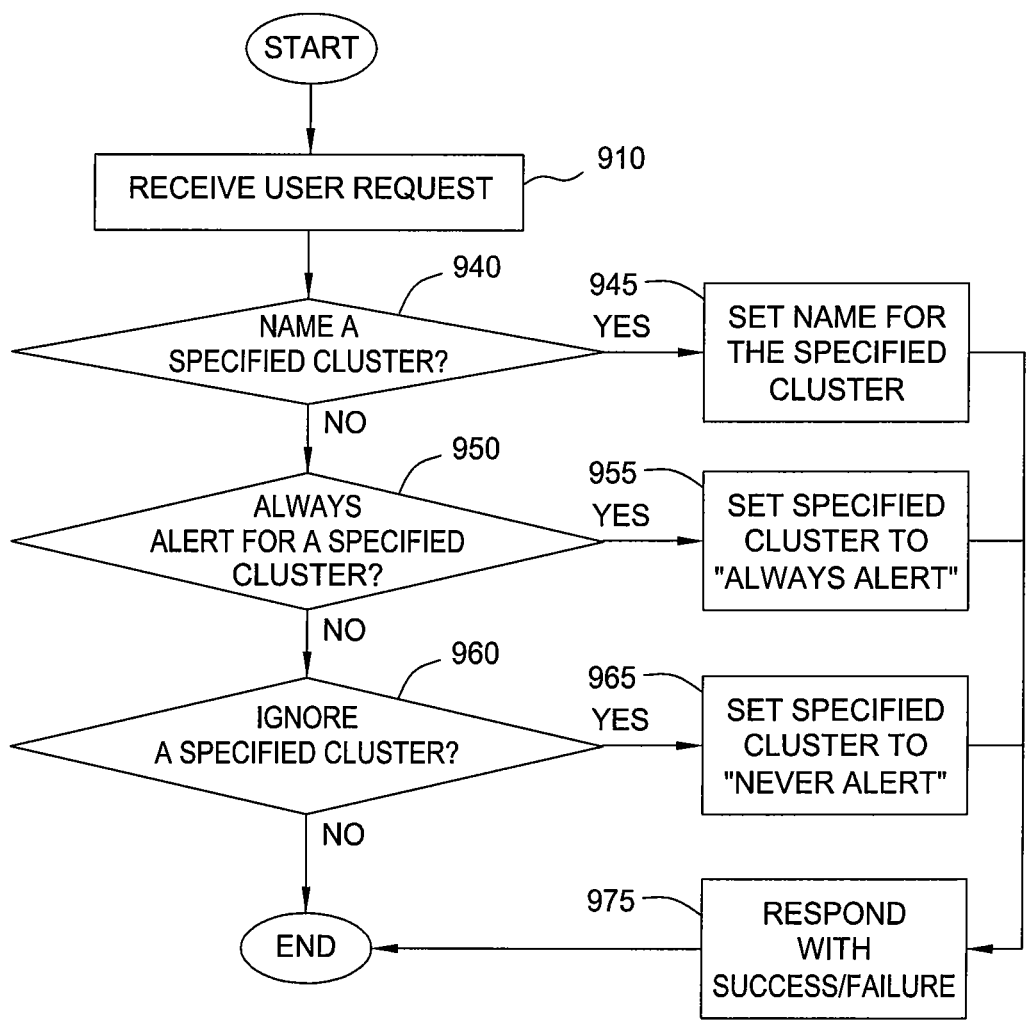
FIG. 9 illustrates a method for modifying an event map, according to one embodiment of the invention.

FIG. 9 illustrates a method 900 for modifying an event map, according to one embodiment of the invention. As shown, the method 900 begins at step 910, where the transaction server 260 receives a user request to modify the event map. If the user request is to name a specified cluster (step 940), the transaction server 260 may set the name for the specified cluster (step 945). If the user request is to always alert for a specified cluster (step 950), the transaction server 260 may set the mapper component 211 to always alert upon detecting input data mapping to the specified cluster (step 955). If the user request is to ignore a specified cluster (step 960), the transaction server 260 may set the mapper component 211 to never alert upon detecting an event matching the specified cluster (step 965). Further, the user may also request to modify other properties associated with a cluster. After the steps 925, 945, 955, or 965, the transaction server 260 may respond with a success or failure of servicing the user request (step 975). After steps 960 or 975, the method 900 terminates.

Advantageously, embodiments of the invention provide users with a visualization of data observed by a machine learning engine of a behavior recognition system. Further, the visualization may provide an interface used to guide system behavior. For example, a user may use the interface to specify that the behavior recognition system is to alert (or not to alert) on detecting an event that maps to a specified cluster. In one embodiment, the interface visually conveys an event map. The event map represents information learned by the mapper component of the machine learning engine. That is, the event map conveys information used by the computer vision engine to identify uncommon events as they are observed to occur in a sequence of video frames. Further, a transaction server of the machine learning engine may receive a request to view an event map for a specified scene. The transaction server may generate the event map for the specified scene. The event map may include a background model of the specified scene and at least one cluster. The event map may also be configured to allow a user to view and/or modify properties associated with a cluster. For example, the user may label a cluster and set events matching the cluster to never generate an alert.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a request to view an event map of a specified event type for a scene depicted in a sequence of video frames;
retrieving a background image associated with the scene;
retrieving an adaptive resonance theory (ART) network modeling the specified event type, wherein the ART network is generated from the sequence of video frames depicting the scene captured by a video camera, and wherein a location of each cluster in the ART network models a region of the scene where one or more events of the specified type has been to observed to occur;
generating a visual representation of each cluster; and
superimposing each visual representation over the background image of the scene.

2. The computer-implemented method of claim 1, wherein the visual representation of each cluster is generated at least in part from values of properties of the respective cluster, and wherein at least one of shape, size, transparency, orientation, fill color, border thickness, border color, pattern, label, and marking of the visual representation is determined from values of properties of the respective cluster.

3. The computer-implemented method of claim 1, further comprising:
receiving user input specifying a filter condition for selecting one or more clusters from the ART network to include in the event map; and
excluding clusters from the event map consistent with the filter condition.

4. The computer-implemented method of claim 1, further comprising:
receiving user input modifying a property of a specified cluster, wherein the property is selected from at least: (i) a name for the specified cluster; (ii) whether an alert message is to be published upon detecting, from data streams generated from the sequence of video frames, an occurrence of an event mapping to the specified cluster; and (iii) whether an alert message is not to be published even upon detecting, from the data streams, an occurrence of an event matching the specified cluster; and
modifying the property of the specified cluster, based on the received user input.

5. The computer-implemented method of claim 4, wherein the data streams include:
(i) a stream of context events generated by a computer vision engine, wherein each context event provides kinematic data related to a foreground object observed by the computer vision engine in the sequence of video frames; and (ii) a stream of primitive events generated by a machine learning engine, and wherein each primitive event provides a semantic description of a group of one or more context events.

6. The computer-implemented method of claim 5, wherein one of the context events provides a classification of what is depicted by a foreground object detected in the scene by the computer vision engine, and wherein the classification classifies the foreground object as depicting one of a person, a vehicle, or an unknown, and an other class of foreground object.

7. The computer-implemented method of claim 5, wherein the kinematic data includes at least one of a coordinate position in a frame of video where an event is observed to occur, and wherein the event is one of an appearance of a foreground object, a disappearance of a foreground object, a height of a foreground object, a width of a foreground object, a velocity in a horizontal dimension of a foreground object, a velocity in a vertical dimension of a foreground object, a rate of acceleration in a horizontal dimension of a foreground object, and a rate of acceleration in a vertical dimension of a foreground object.

8. A computer-readable storage medium containing a program which, when executed, performs an operation comprising:
   receiving a request to view an event map of a specified event type for a scene depicted in a sequence of video frames;
   retrieving a background image associated with the scene;
   retrieving an adaptive resonance theory (ART) network modeling the specified event type, wherein the ART network is generated from the sequence of video frames depicting the scene captured by a video camera, and wherein a location of each cluster in the ART network models a region of the scene where one or more events of the specified type has been to observed to occur;
   generating a visual representation of each cluster; and
   superimposing each visual representation over the background image of the scene.

9. The computer-readable storage medium of claim 8, wherein the visual representation of each cluster is generated at least in part from values of properties of the respective cluster, and wherein at least one of shape, size, transparency, orientation, fill color, border thickness, border color, pattern, label, and marking of the visual representation is determined from values of properties of the respective cluster.

10. The computer-readable storage medium of claim 8, wherein the operation further comprises:
    receiving user input specifying a filter condition for selecting one or more clusters from the ART network to include in the event map; and
    excluding clusters from the event map consistent with the filter condition.

11. The computer-readable storage medium of claim 8, wherein the operation further comprises:
    receiving user input modifying a property of a specified cluster, wherein the property is selected from at least: (i) a name for the specified cluster; (ii) whether an alert message is to be published upon detecting, from data streams generated from the sequence of video frames, an occurrence of an event mapping to the specified cluster; and (iii) whether an alert message is not to be published even upon detecting, from the data streams, an occurrence of an event matching the specified cluster; and
    modifying the property of the specified cluster, based on the received user input.

12. The computer-readable storage medium of claim 11, wherein the data streams include:
    (i) a stream of context events generated by a computer vision engine, wherein each context event provides kinematic data related to a foreground object observed by the computer vision engine in the sequence of video frames; and
    (ii) a stream of primitive events generated by a machine learning engine, and wherein each primitive event provides a semantic description of a group of one or more context events.

13. The computer-readable storage medium of claim 12, wherein one of the context events provides a classification of what is depicted by a foreground object detected in the scene by the computer vision engine, and wherein the classification classifies the foreground object as depicting one of a person, a vehicle, or an unknown, and an other class of foreground object.

14. The computer-readable storage medium of claim 12, wherein the kinematic data includes at least one of a coordinate position in a frame of video where an event is observed to occur, and wherein the event is one of an appearance of a foreground object, a disappearance of a foreground object, a height of a foreground object, a width of a foreground object, a velocity in a horizontal dimension of a foreground object, a velocity in a vertical dimension of a foreground object, a rate of acceleration in a horizontal dimension of a foreground object, and a rate of acceleration in a vertical dimension of a foreground object.

15. A system, comprising:
    one or more computer processors; and
    a memory containing a program, which when executed by the one or more computer processors is configured to perform an operation comprising:
       receiving a request to view an event map of a specified event type for a scene depicted in a sequence of video frames;
       retrieving a background image associated with the scene;
       retrieving an adaptive resonance theory (ART) network modeling the specified event type, wherein the ART network is generated from the sequence of video frames depicting the scene captured by a video camera, and wherein a location of each cluster in the ART network models a region of the scene where one or more events of the specified type has been to observed to occur;
       generating a visual representation of each cluster; and
       superimposing each visual representation over the background image of the scene.

16. The system of claim 15, wherein the visual representation of each cluster is generated at least in part from values of properties of the respective cluster, and wherein at least one of shape, size, transparency, orientation, fill color, border thickness, border color, pattern, label, and marking of the visual representation is determined from values of properties of the respective cluster.

17. The system of claim 15, wherein the operation further comprises:
    receiving user input specifying a filter condition for selecting one or more clusters from the ART network to include in the event map; and
    excluding clusters from the event map consistent with the filter condition.

18. The system of claim 15, wherein the operation further comprises:

receiving user input modifying a property of a specified cluster, wherein the property is selected from at least: (i) a name for the specified cluster; (ii) whether an alert message is to be published upon detecting, from data streams generated from the sequence of video frames, an occurrence of an event mapping to the specified cluster; and (iii) whether an alert message is not to be published even upon detecting, from the data streams, an occurrence of an event matching the specified cluster; and modifying the property of the specified cluster, based on the received user input.

19. The system of claim 18, wherein the data streams include:

(i) a stream of context events generated by a computer vision engine, wherein each context event provides kinematic data related to a foreground object observed by the computer vision engine in the sequence of video frames; and (ii) a stream of primitive events generated by a machine learning engine, and wherein each primitive event provides a semantic description of a group of one or more context events.

20. The system of claim 19, wherein one of the context events provides a classification of what is depicted by a foreground object detected in the scene by the computer vision engine, and wherein the classification classifies the foreground object as depicting one of a person, a vehicle, or an unknown, and an other class of foreground object.

21. The system of claim 19, wherein the kinematic data includes at least one of a coordinate position in a frame of video where an event is observed to occur, and wherein the event is one of an appearance of a foreground object, a disappearance of a foreground object, a height of a foreground object, a width of a foreground object, a velocity in a horizontal dimension of a foreground object, a velocity in a vertical dimension of a foreground object, a rate of acceleration in a horizontal dimension of a foreground object, and a rate of acceleration in a vertical dimension of a foreground object.

* * * * *